US006812407B1

United States Patent
Opperman

(10) Patent No.: US 6,812,407 B1
(45) Date of Patent: Nov. 2, 2004

(54) DOOR WIRE ROUTING SYSTEM

(76) Inventor: Nicholas S. Opperman, 12227 W. Coalmine Dr., Littleton, CO (US) 80127

( * ) Notice: Subject to any disclaimer, the term of this patent is extended or adjusted under 35 U.S.C. 154(b) by 0 days.

(21) Appl. No.: 10/734,331

(22) Filed: Dec. 12, 2003

(51) Int. Cl.[7] .......................... H02G 3/00; H01B 17/26
(52) U.S. Cl. ................. 174/100; 174/65 R; 174/68.1; 174/72 A; 174/135; 174/152 G; 16/2.2; 49/504; 439/445
(58) Field of Search ...................... 174/65 G, 65 R, 174/65 SS, 68.1, 68.3, 69, 72 A, 72 C, 73.1, 100, 101, 135, 151, 152 G, 153 G; 16/2.1, 2.2; 49/502, 504; 296/146.7; 439/31, 165, 445–448

(56) References Cited

U.S. PATENT DOCUMENTS

| | | | |
|---|---|---|---|
| 3,053,564 A | 9/1962 | Evans et al. .................. 296/44 |
| 3,151,905 A | 10/1964 | Reuther et al. ............... 296/44 |
| 3,842,386 A | 10/1974 | Suska ............................ 339/4 |
| 3,848,361 A | 11/1974 | Foster et al. .................. 49/167 |
| 3,857,625 A | 12/1974 | Crane et al. ................... 339/4 |
| 4,140,357 A | 2/1979 | Wolz et al. .................... 339/4 |
| 4,168,409 A | 9/1979 | McNinch ................... 200/61.7 |
| 4,412,711 A | 11/1983 | Suska ............................ 339/4 |
| 4,445,299 A | 5/1984 | Lehikoinen et al. .......... 49/167 |
| 4,543,800 A * | 10/1985 | Mawby et al. .............. 439/165 |
| 4,653,799 A | 3/1987 | Arai et al. ................... 296/146 |
| 4,839,939 A | 6/1989 | O'Brien, II ................... 16/223 |
| 4,912,942 A * | 4/1990 | Katterhenry et al. ........ 439/446 |
| 5,127,842 A | 7/1992 | Kelly .......................... 439/165 |
| 5,212,907 A | 5/1993 | Van Sandt ..................... 49/70 |
| 5,448,017 A * | 9/1995 | Nakajima et al. ........ 174/152 G |
| 5,586,895 A | 12/1996 | Zehrung ..................... 439/165 |
| 5,690,501 A | 11/1997 | Mader ........................ 439/165 |
| 5,716,044 A * | 2/1998 | Peterson et al. .............. 49/502 |
| 5,727,960 A | 3/1998 | Zehrung ..................... 439/165 |
| 6,015,952 A * | 1/2000 | Mori ........................ 174/72 R |
| 6,079,764 A * | 6/2000 | Suzuki et al. ................. 49/502 |
| 6,107,570 A * | 8/2000 | Suzuki et al. ............. 174/72 A |
| 6,303,869 B1 * | 10/2001 | Shanahan et al. ....... 174/153 G |
| 6,350,956 B1 * | 2/2002 | Sakata ........................ 174/101 |
| 6,372,986 B1 * | 4/2002 | Saeki et al. ............... 174/65 G |
| 6,534,713 B2 * | 3/2003 | Kafer ........................ 174/72 A |
| 6,635,825 B2 * | 10/2003 | Adachi ..................... 174/72 A |

* cited by examiner

*Primary Examiner*—Anthony Dinkins
*Assistant Examiner*—Adolfo Nino

(57) ABSTRACT

A door wire routing system for efficiently routing wiring from a door jam to a swinging door in a concealed and protective manner. The door wire routing system includes a flexible tubular member that receives and protects a wire, and a pair of guide members that slidably receive the tubular member. One of the guide members is installed within an opening within a doorjamb and the other guide member is installed within an opening within an inner edge of a door member. The wire is extended through the tubular member for providing electrical power and data communications to the door member. When the door member is opened or closed, the tubular member slides within the guide members while protecting the wire from damage or sabotage.

20 Claims, 9 Drawing Sheets

DOOR WIRE ROUTING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to door wiring devices and more specifically it relates to a door wire routing system for efficiently routing wiring from a door jam to a swinging door in a concealed and protective manner.

2. Description of the Related Art

Door wiring systems have been in use for years. Conventional door wiring systems are typically comprised of a cable attached to a doorjamb and a door by conventional fasteners. With conventional door wiring systems, a channel must be routed out within the doorjamb and the inner edge of the door so the cable can rest in the same when the door is closed. Another system of connecting wiring between a door frame and a door is by simply exposing the wire from the door frame to the door without attempting to conceal the wire between the doorjamb and the inner edge of the door.

Conventional door wiring systems are susceptible to damage or sabotage. In addition, conventional door wiring systems do not provide an aesthetically pleasing system for connecting wiring to a door. Another problem with conventional door wiring systems is that they do not adequately conceal wiring between a door frame and a door.

While these devices may be suitable for the particular purpose to which they address, they are not as suitable for efficiently routing wiring from a door jam to a swinging door in a concealed and protective manner. Conventional door wiring systems are susceptible to damage and sabotage, and do not adequately conceal wiring between a door frame and a door.

In these respects, the door wire routing system according to the present invention substantially departs from the conventional concepts and designs of the prior art, and in so doing provides an apparatus primarily developed for the purpose of efficiently routing wiring from a door jam to a swinging door in a concealed and protective manner.

BRIEF SUMMARY OF THE INVENTION

In view of the foregoing disadvantages inherent in the known types of door wiring systems now present in the prior art, the present invention provides a new door wire routing system construction wherein the same can be utilized for efficiently routing wiring from a door jam to a swinging door in a concealed and protective manner.

The general purpose of the present invention, which will be described subsequently in greater detail, is to provide a new door wire routing system that has many of the advantages of the door wiring systems mentioned heretofore and many novel features that result in a new door wire routing system which is not anticipated, rendered obvious, suggested, or even implied by any of the prior art door wiring systems, either alone or in any combination thereof.

To attain this, the present invention generally comprises a flexible tubular member that receives and protects a wire, and a pair of guide members that slidably receive the tubular member. One of the guide members is installed within an opening within a doorjamb and the other guide member is installed within an opening within an inner edge of a door member. The wire is extended through the tubular member for providing electrical power and data communications to the door member. When the door member is opened or closed, the tubular member slides within the guide members while protecting the wire from damage or sabotage.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a door wire routing system that will overcome the shortcomings of the prior art devices.

A second object is to provide a door wire routing system for efficiently routing wiring from a door jam to a swinging door in a concealed and protective manner.

Another object is to provide a door wire routing system that is easy to install within existing doors.

An additional object is to provide a door wire routing system that prevents vandalism with respect to the wiring to a door.

A further object is to provide a door wire routing system that does not require routering of a doorjamb.

Another object is to provide a door wire routing system that is substantially concealed with a door is closed.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
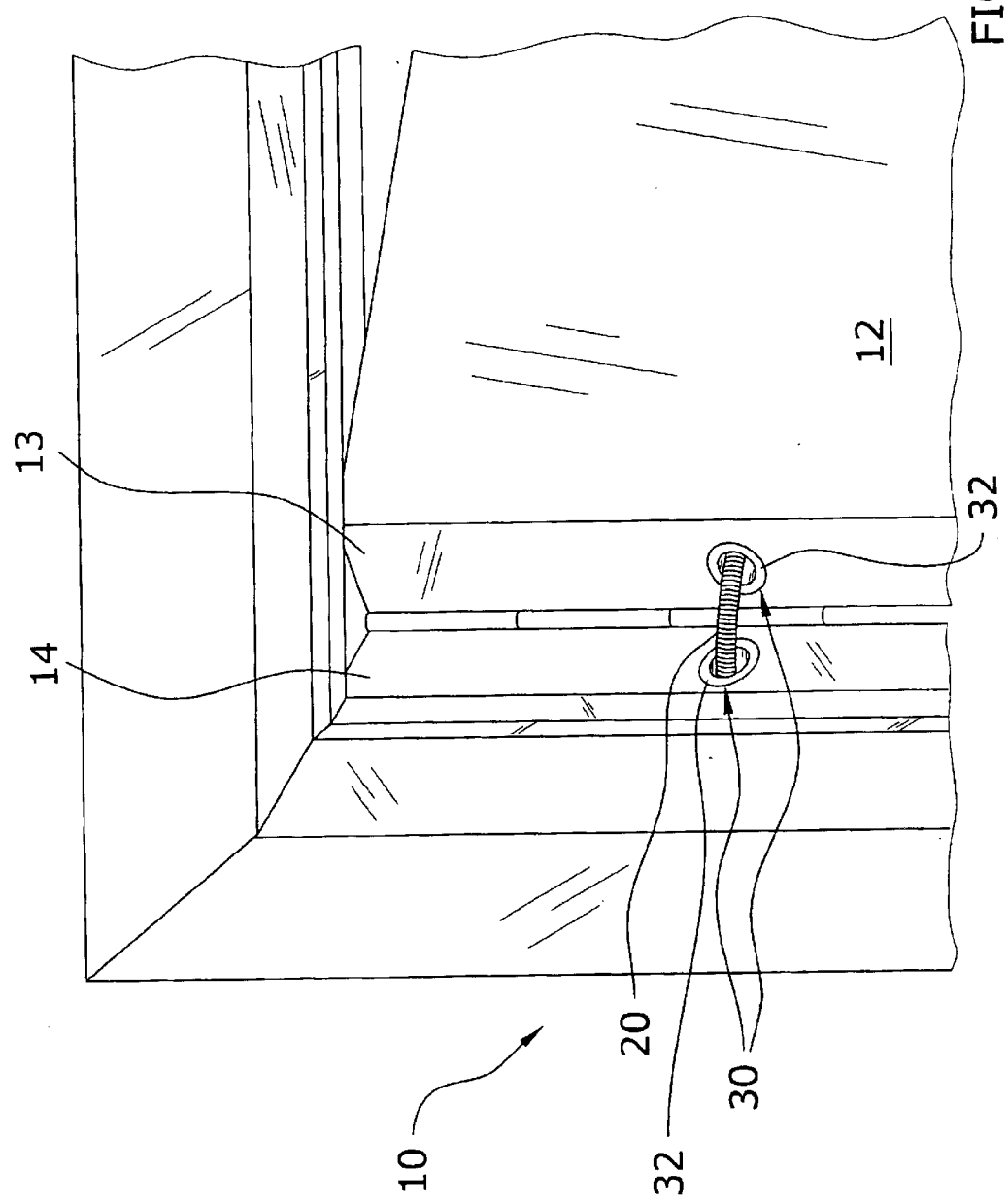
FIG. 1 is a perspective view of the present invention installed within a door member and a doorjamb with the door member open.

Turning now descriptively to the drawings, in which similar reference characters denote similar elements throughout the several views, FIGS. 1 through 9 illustrate a door wire routing system 10, which comprises a flexible tubular member 20 that receives and protects a wire 16, and a pair of guide members 30 that slidably receive the tubular member 20. One of the guide members 30 is installed within an opening within a doorjamb 14 and the other guide member 30 is installed within an opening within an inner edge 13 of a door member 12. The wire 16 is extended through the tubular member 20 for providing electrical power and data communications to the door member 12. When the door member 12 is opened or closed, the tubular member 20 slides within the guide members 30 while protecting the wire 16 from damage or sabotage.

B. Tubular Member

Figure 2:
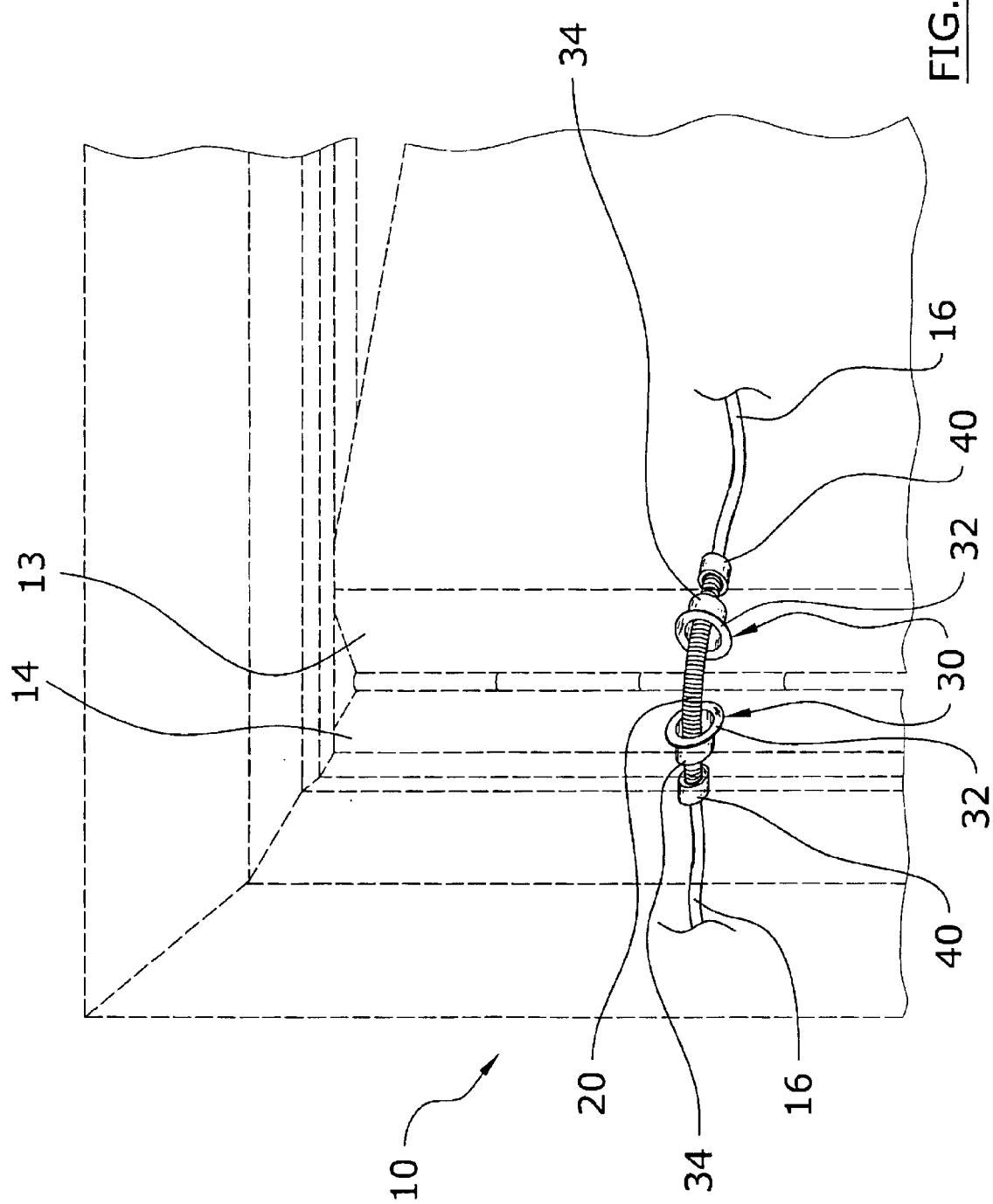
FIG. 2 is a perspective view of the present invention in shadow lines installed within a door member and a doorjamb with the door member open.
Figure 6:
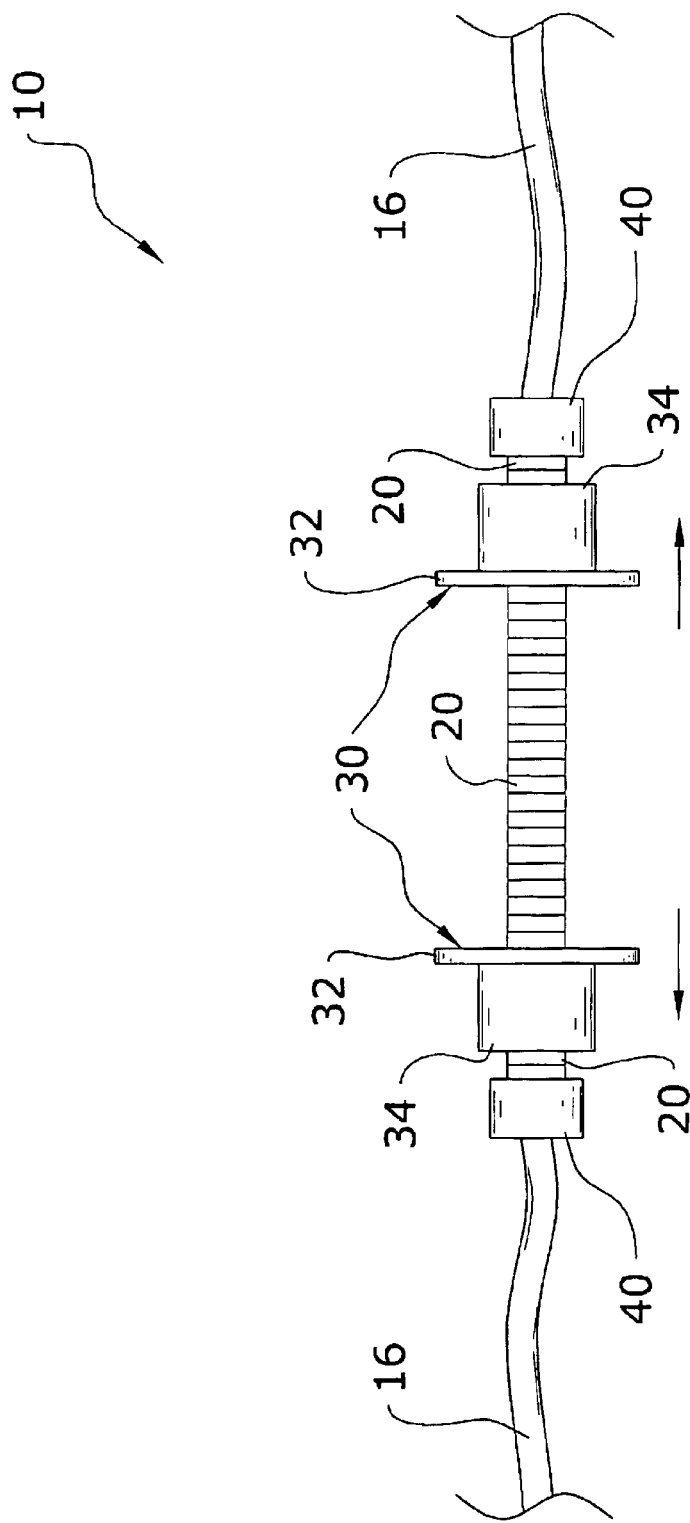
FIG. 6 is a side view of the present invention.
Figure 7:
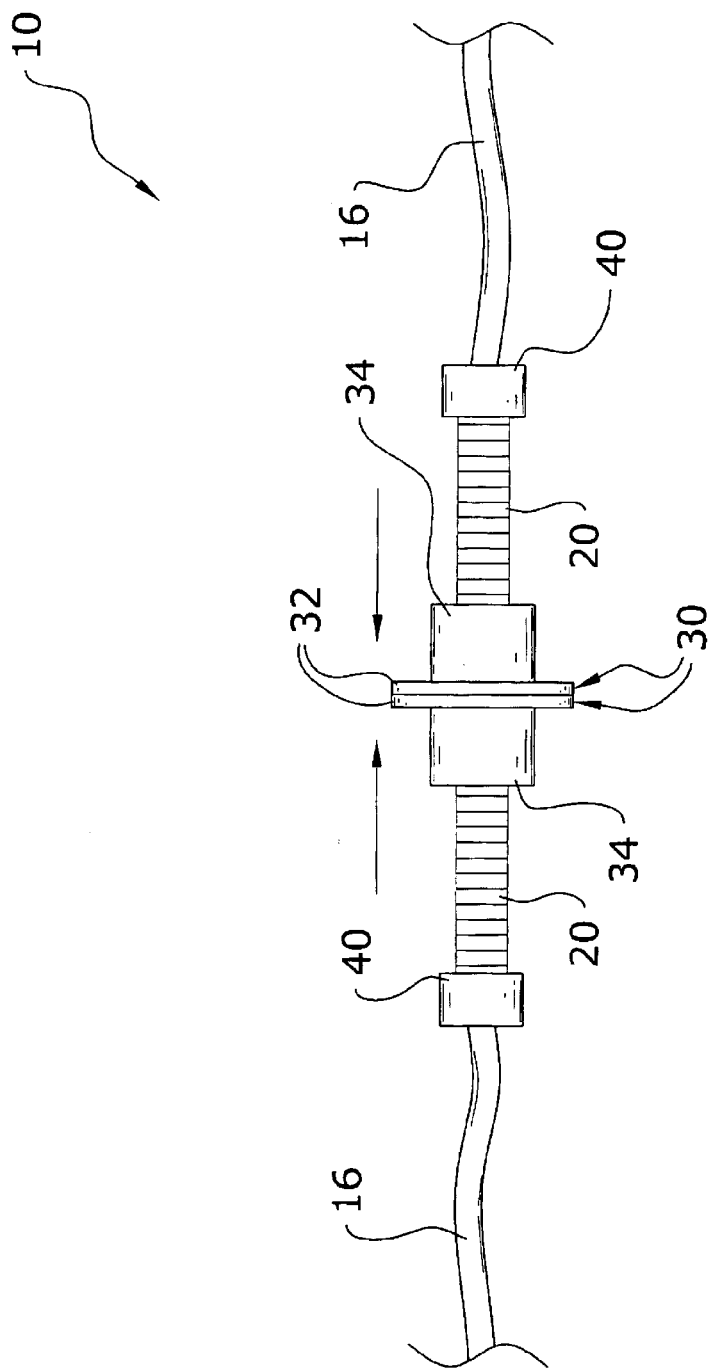
FIG. 7 is a side view of the present invention with the guide members adjacent one another.
Figure 8:
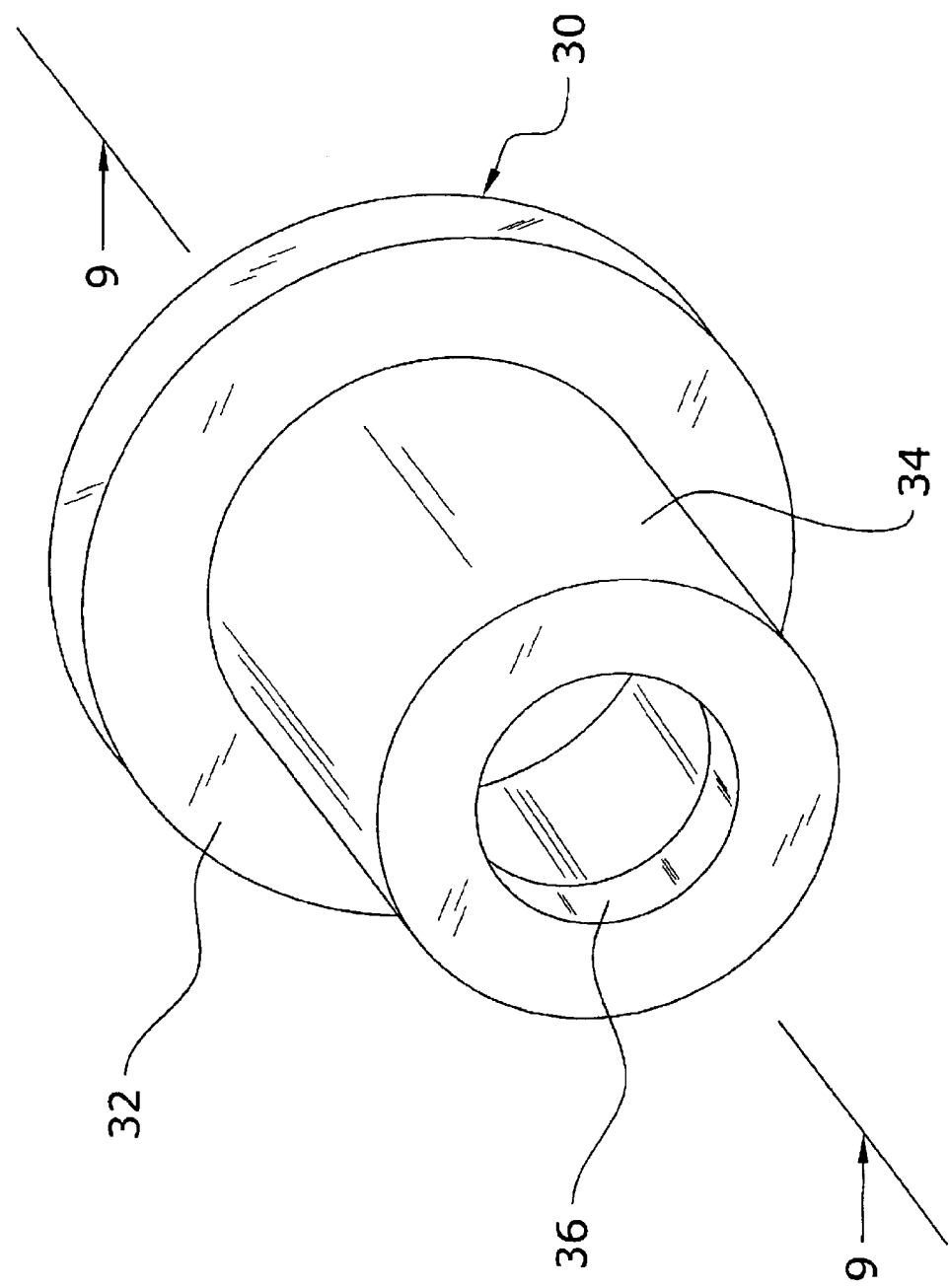
FIG. 8 is an upper perspective view of a guide member.

The tubular member 20 is for receiving at least one wire 16 as shown in FIGS. 2, 6 and 7 of the drawings. The tubular member 20 may be comprised of a flexible material to allow for flexing of the tubular member 20 during closing and opening of the door member 12. Various types of materials and structures may be utilized to construct the tubular member 20 such as but not limited to plastic, metal and the like.

The tubular member 20 may have a length greater than 2 inches to allow for the extension between the guide members 30 when the door is opened as illustrated in FIGS. 1 and 2 of the drawings. The tubular member 20 may have various cross sectional shapes such as but not limited circular.

C. Guide Members

The pair of tubular guide members 30 slidably receive the tubular member 20 as illustrated in FIGS. 1 through 7 of the drawings. One of the guide members 30 is attached within a doorjamb 14 and one of the guide members 30 is attached within an inner edge 13 of a door member 12 as illustrated in FIGS. 1 and 2 of the drawings.

The guide members 30 may each include a flanged portion 32 and a tubular portion 34 extending from the flanged portion 32 as shown in FIGS. 3, 4, 8 and 9 of the drawings. The guide members 30 may have various sizes and shapes as can be appreciated.

Figure 4:
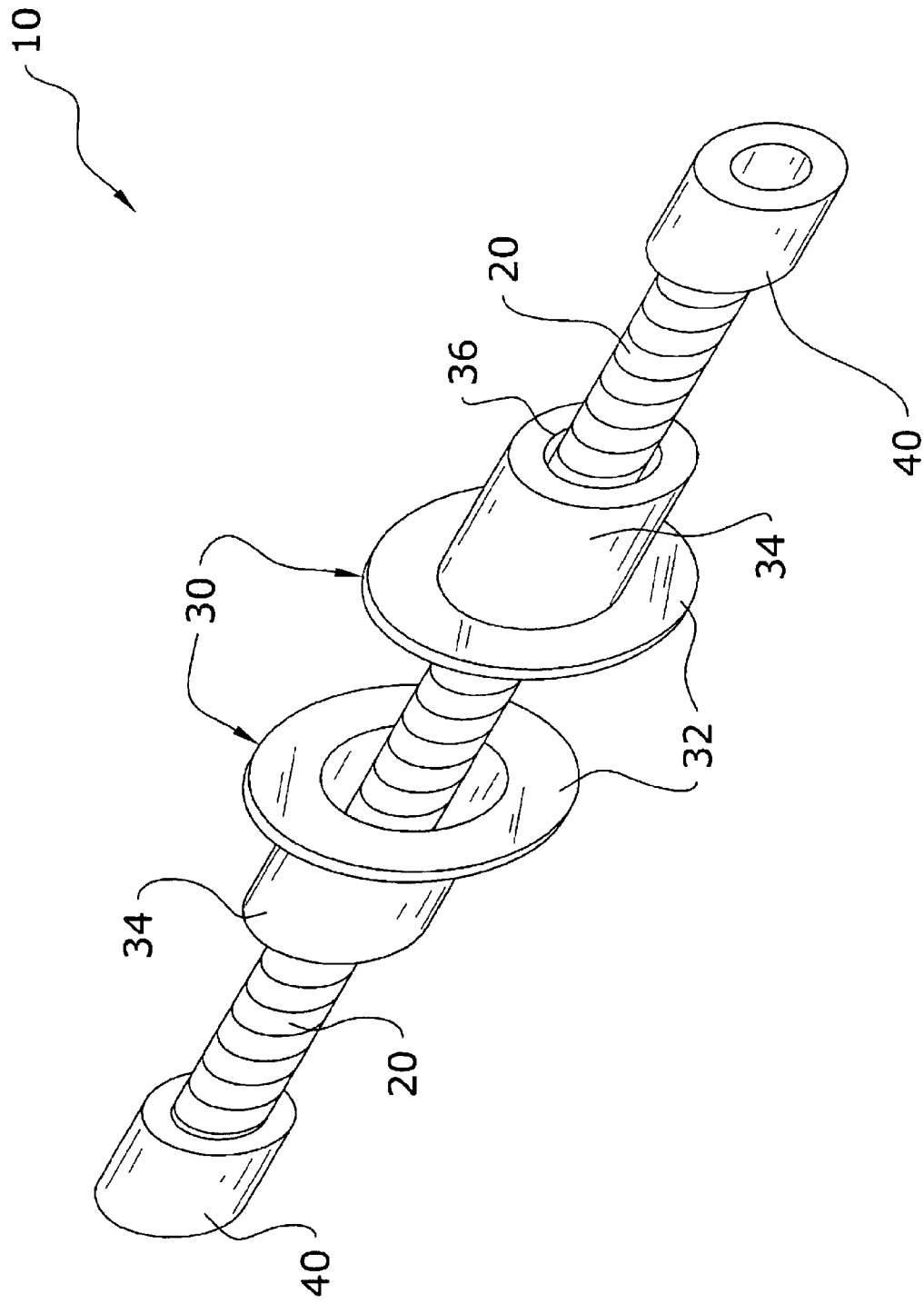
FIG. 4 is an upper perspective view of the present invention.
Figure 5:
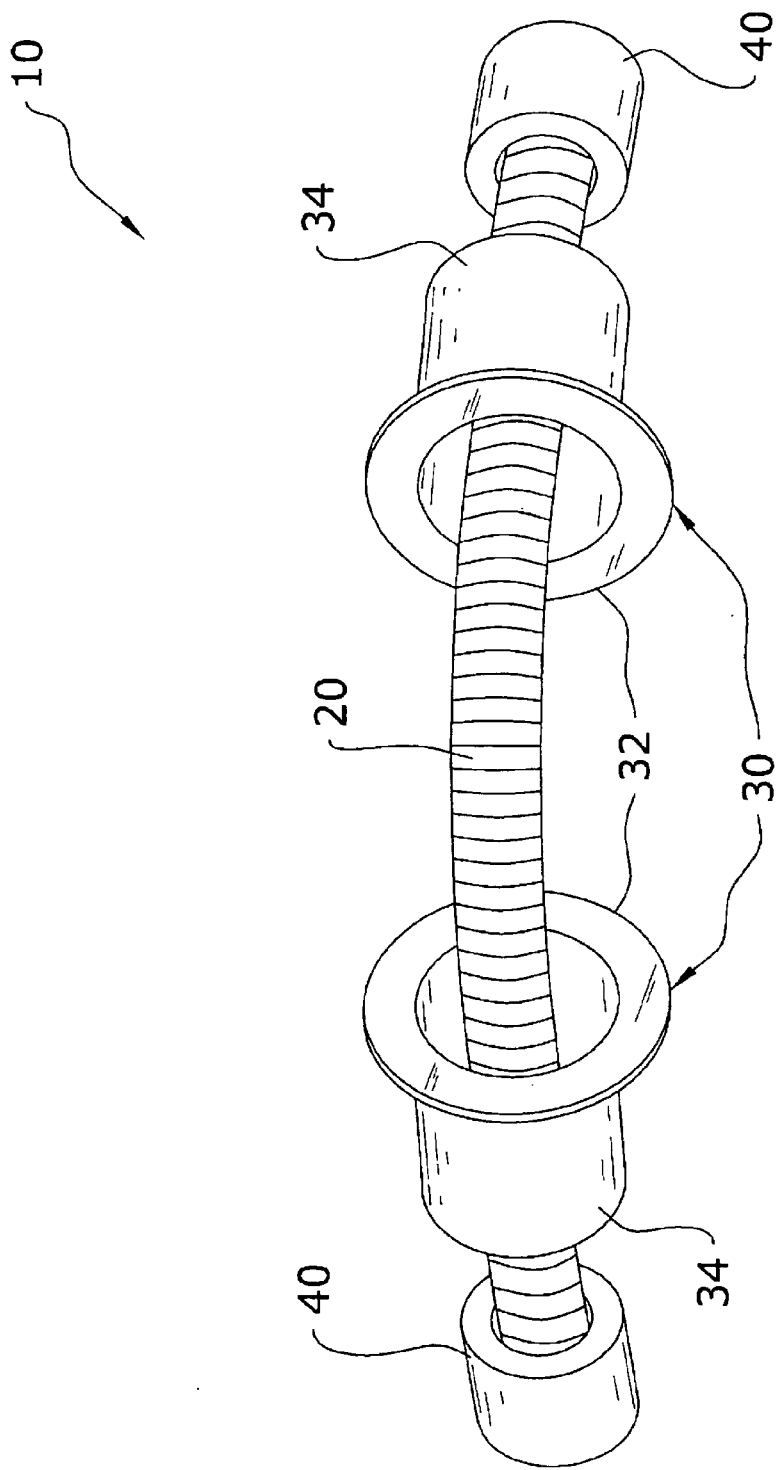
FIG. 5 is a lower perspective view of the present invention with the tubular member being bent.
Figure 9:
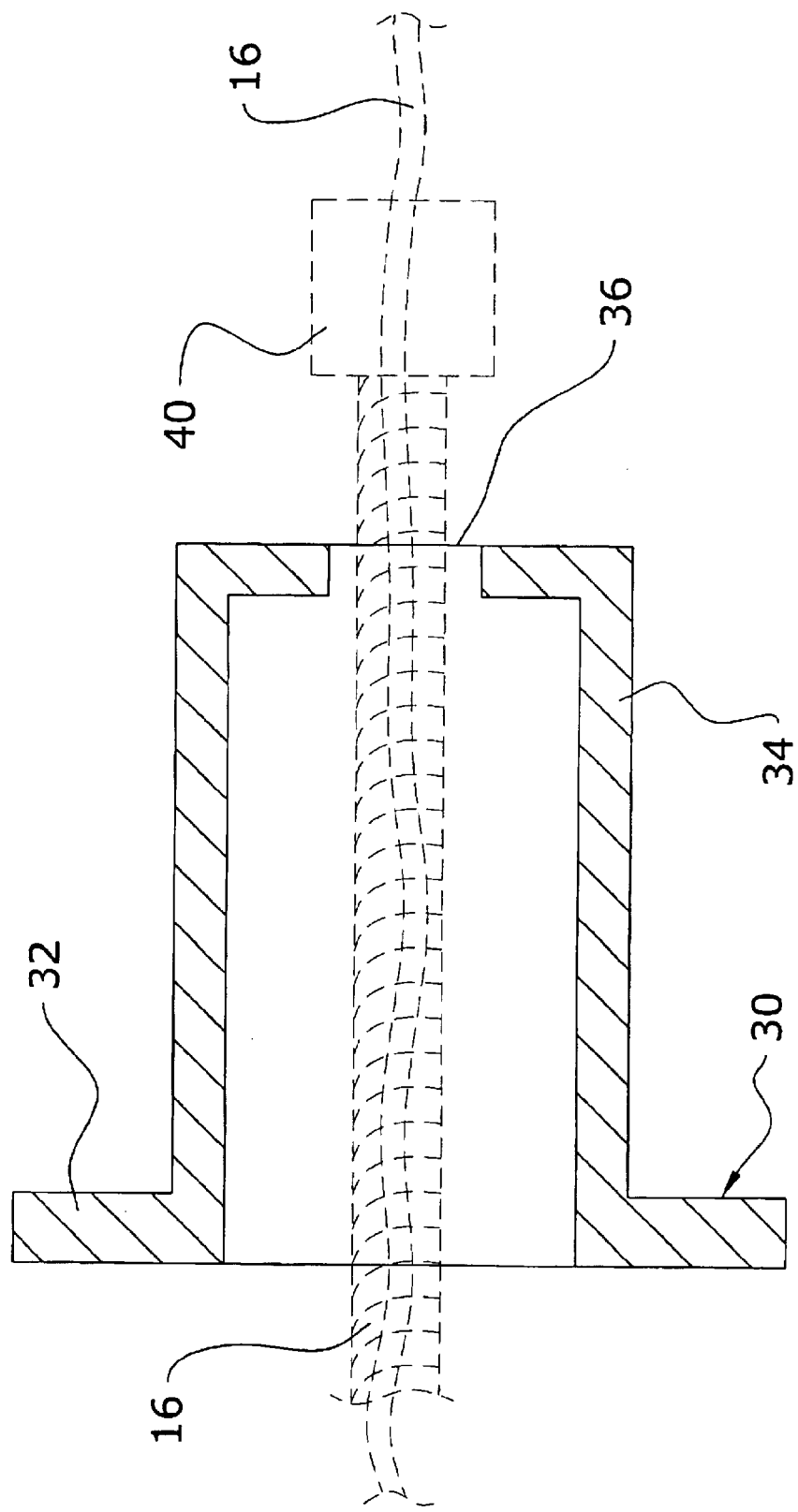
FIG. 9 is a cross sectional view taken along line 9—9 of FIG. 8 illustrating the guide member structure.

The guide members 30 each have a front opening for receiving the tubular member 20 as shown in FIGS. 2 and 5 of the drawings. The front opening for each of the guide members 30 is in opposition to the front opening of the opposing guide member 30. T The guide members 30 also each have a guide aperture 36 at an opposite end of the front opening as best illustrated in FIGS. 4 and 9 of the drawings. The guide aperture 36 may be smaller in size than the front opening. The front opening and the guide aperture 36 within the guide members 30 may be comprised of various sizes and shapes as can be appreciated.

D. Stopper Members

A pair of stopper members 40 may be attached to opposing ends of the tubular member 20 as best illustrated in FIGS. 3 through 7 of the drawings. The stopper members 40 prevent the tubular member 20 from being pulled out of the guide members 30 when the door is being opened or closed. The stopper members 40 are larger in size than the guide aperture 36 as illustrated in FIG. 4 of the drawings. The stopper members 40 may have various sizes, shapes and structures as can be appreciated.

E. Operation of Invention

Figure 3:
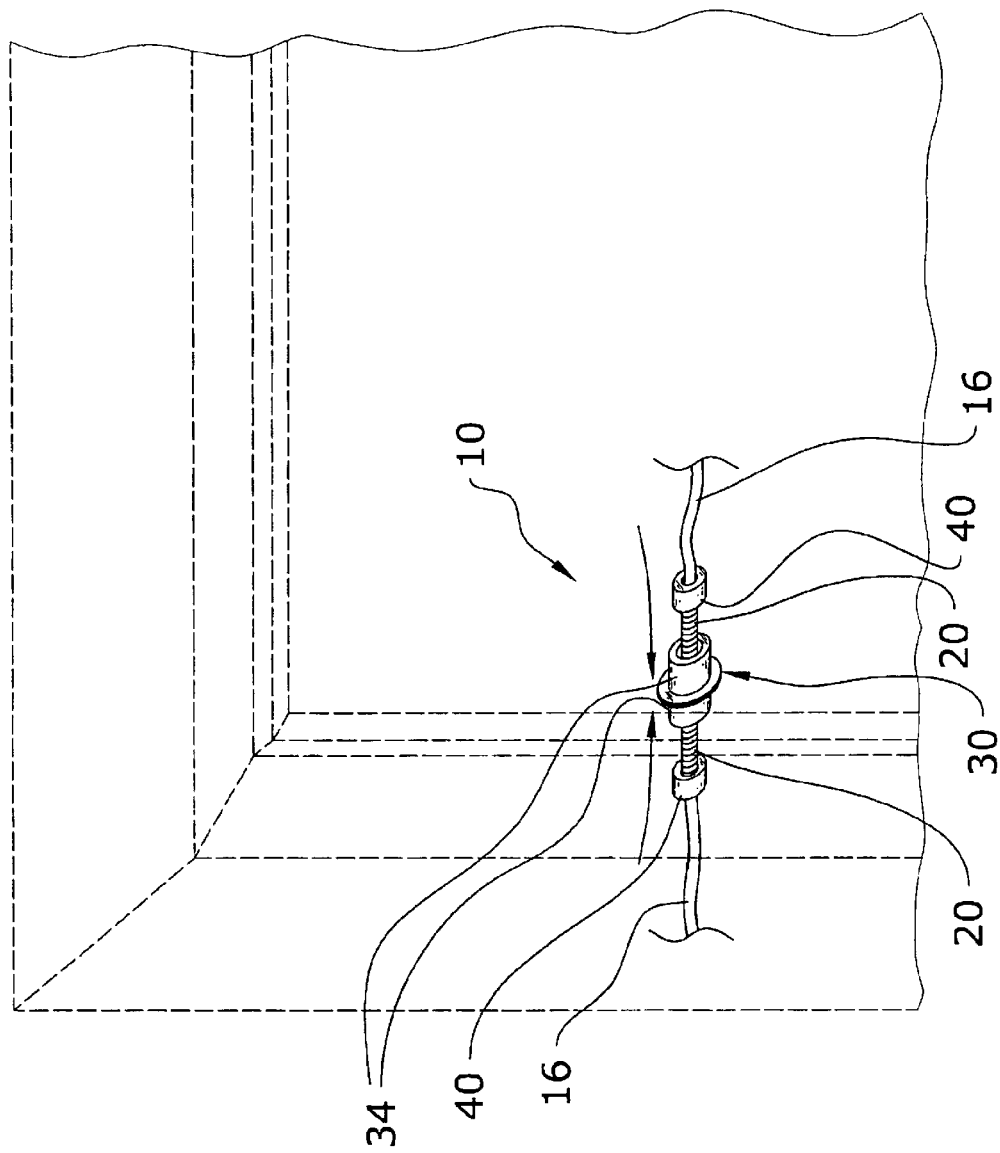
FIG. 3 is a perspective view of the present invention installed within a door member and a doorjamb with the door member closed.

One guide member 30 is installed within a doorjamb 14 by creating an opening within the doorjamb 14 and positioning the guide member 30 within the opening. The guide member 30 is then secured within the doorjamb 14 utilizing conventional fastener means such as but not limited to fasteners, adhesive, glue and the like. The process is repeated for the guide member 30 to be positioned within the inner edge 13 of the door member 12. When completed, the two guide members 30 are in relative opposition to one another with the tubular member 20 slidably positioned through as shown in FIGS. 1 through 3 of the drawings. One or more wires 16 are then extended through the opposing open ends of the tubular member 20 and routed to their desired locations.

When the user opens the door, the tubular member 20 slides within one or both of the guide members 30 to provide increased length between the guide members 30 as shown in FIGS. 1, 2 and 6 of the drawings. The tubular member 20 protects the wires 16 within from damage and from being pinched between the door member 12 and the doorjamb 14. If one of the guide members 30 engages one of the stopper members 40, the stopper member prevents further extension of the tubular member 20 with respect to that guide member 30 to prevent exposure of the wire 16.

When the user closes the door, the tubular member 20 is retracted into one or more of the guide members 30 to reduce the length between the guide members 30 as shown in FIGS. 3, 4 and 7 of the drawings. FIG. 7 illustrates the guide members 30 adjacent to one another with their front openings aligned to receive the wires 16 between thereof.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A door wire routing system, comprising:
   a tubular member for receiving at least one wire; and
   a pair of guide members that slidably receive said tubular member, wherein one of said guide members is installable within a doorjamb and one of said guide members is installable within an inner edge of a door member.

2. The door wire routing system of claim 1, wherein said tubular member is flexible.

3. The door wire routing system of claim 1, including a pair of stopper members attached to opposing ends of said tubular member, wherein said stopper members prevent said tubular member from being pulled out of said guide members.

4. The door wire routing system of claim 1, wherein said guide members each have a tubular structure.

5. The door wire routing system of claim 1, wherein said guide members each include a flanged portion.

6. The door wire routing system of claim 5, wherein said guide member each include a tubular portion extending from said flanged portion.

7. The door wire routing system of claim 6, wherein said tubular portion has a guide aperture that slidably receives said tubular member.

8. The door wire routing system of claim 1, wherein said tubular member has a length greater than 2 inches.

9. The door wire routing system of claim 1, wherein said guide members each have a front opening in opposition to one another.

10. The door wire routing system of claim 9, wherein said guide members each have a guide aperture at an opposite end of said front opening, wherein said guide aperture is smaller in size than said front opening.

11. A door wire routing system, comprising:
    a tubular member for receiving at least one wire; and
    a pair of guide members that slidably receive said tubular member, wherein one of said guide members is attached within a doorjamb and one of said guide members is attached within an inner edge of a door member.

12. The door wire routing system of claim 11, wherein said tubular member is flexible.

13. The door wire routing system of claim 11, including a pair of stopper members attached to opposing ends of said tubular member, wherein said stopper members prevent said tubular member from being pulled out of said guide members.

14. The door wire routing system of claim 11, wherein said guide members each have a tubular structure.

15. The door wire routing system of claim 11, wherein said guide members each include a flanged portion.

16. The door wire routing system of claim 15, wherein said guide member each include a tubular portion extending from said flanged portion.

17. The door wire routing system of claim 16, wherein said tubular portion has a guide aperture that slidably receives said tubular member.

18. The door wire routing system of claim 11, wherein said tubular member has a length greater than 2 inches.

19. The door wire routing system of claim 11, wherein said guide members each have a front opening in opposition to one another, wherein said guide members each have a guide aperture at an opposite end of said front opening, and wherein said guide aperture is smaller in size than said front opening.

20. A door wire routing system, comprising:
    a flexible tubular member for receiving at least one wire, wherein said tubular member has a length greater than 2 inches; and
    a pair of tubular guide members that slidably receive said tubular member, wherein one of said guide members is attached within a doorjamb and one of said guide members is attached within an inner edge of a door member;
    wherein said guide members each include a flanged portion and a tubular portion extending from said flanged portion;
    wherein said guide members each have a front opening in opposition to one another, wherein said guide members each have a guide aperture at an opposite end of said front opening, and wherein said guide aperture is smaller in size than said front opening; and
    a pair of stopper members attached to opposing ends of said tubular member, wherein said stopper members prevent said tubular member from being pulled out of said guide members and wherein said stopper members are larger in size than said guide aperture.

* * * * *